(12) United States Patent
Marthin (10) Patent No.: US 11,204,954 B2
(45) Date of Patent: Dec. 21, 2021

(54) EDITABLE MEDIA FILE FORMAT

(71) Applicant: Editable Media ApS, Copenhagen K (DK)

(72) Inventor: Alexander Marthin, Copenhagen (DK)

(73) Assignee: Editable Media ApS, Copenhagen (DK)

(*) Notice: Subject to any disclaimer, the term of this patent is extended or adjusted under 35 U.S.C. 154(b) by 0 days.

(21) Appl. No.: 16/875,651

(22) Filed: May 15, 2020

(65) Prior Publication Data

US 2020/0372062 A1 Nov. 26, 2020

(30) Foreign Application Priority Data

May 21, 2019 (EP) ..................................... 19175610

(51) Int. Cl.
| | |
|---|---|
| *G06F 16/41* | (2019.01) |
| *G06F 16/22* | (2019.01) |
| *G06F 16/438* | (2019.01) |
| *G06F 16/483* | (2019.01) |
| *G06F 16/21* | (2019.01) |

(52) U.S. Cl.
CPC ............ *G06F 16/41* (2019.01); *G06F 16/211* (2019.01); *G06F 16/221* (2019.01); *G06F 16/438* (2019.01); *G06F 16/483* (2019.01)

(58) Field of Classification Search
CPC ....................................................... G06F 16/41
See application file for complete search history.

(56) References Cited

U.S. PATENT DOCUMENTS

| | | | |
|---|---|---|---|
| 2004/0131330 A1 | 7/2004 | Wilkins | |
| 2014/0304379 A1 | 10/2014 | Samaniego | |
| 2016/0057462 A1 | 2/2016 | Mitchell | |
| 2019/0236152 A1* | 8/2019 | Sacilotto, Jr. ........ | H04N 21/858 |

OTHER PUBLICATIONS

Amon, Peter, Thomas Rathgen, and David Singer. "File format for scalable video coding." IEEE Transactions on Circuits and Systems for Video Technology 17.9 (2007): 1174-1185. (Year: 2007).*
Extended European Search Report, EP Application No. 19175610.

* cited by examiner

*Primary Examiner* — Jay A Morrison
(74) *Attorney, Agent, or Firm* — Avant Law Group, LLC (57) ABSTRACT

The disclosure relates to a digital media file format comprising a number of sections for storing information, said sections comprising a first section with compiled reproducible media content, and a second section comprising one or more media elements. The disclosure further relates to a digital media file in the digital media file format, a computer-readable medium comprising the digital media file format, a method for creating a digital media file in the digital media file format, a method of obtaining a variant of a digital media file in the digital media file format, and a system for providing a digital media file in the digital media file format.

16 Claims, 6 Drawing Sheets

EDITABLE MEDIA FILE FORMAT

CROSS-REFERENCE TO RELATED APPLICATIONS

This application claims the benefit of priority of European Patent Application No. 19175610, filed May 21, 2019, the disclosure of which is incorporated herein by reference in its entirety.

FIELD

The disclosure relates to a digital media file format, a digital media file in the digital media file format, a computer-readable medium comprising the digital media file format, a method for creating a digital media file in the digital media file format, a method of obtaining a variant of a digital media file in the digital media file format, and a system for providing a digital media file in the digital media file format.

BACKGROUND

When making a digital media file, raw data, such as raw footage, recordings, or the like, are typically processed in various steps to generate a final version comprising the processed raw data. The processing steps are typically performed digitally by means of a digital media editor. Subsequently, the final version is compiled from the digital media editor into a non-editable, reproducible media file, which can be played in a digital media renderer. The specifics in the processing may be stored in a project file, readable by the digital media editor.

To make digital media files, such as for instance films or commercials, segments from different pieces of raw data, e.g. takes of scenes, audio tracks from different microphones and animations may be combined into a single film. The combination of these elements, which is carried out in a digital media editor, is subsequently compiled into a digital media file in a non-editable file format, such as an MPEG file format. This compiled, digital media file may then be distributed to customers, end users, or the like, who may play it back.

As films and commercials are, for instance, typically shown in different countries, a number of different versions with different content may need to be produced from the same raw data. Examples of different versions could be versions, wherein the speech is synchronised, or where different pieces of text, e.g. slogans or the like, are shown on screen. This may result in many different compiled digital media files, taking up space. These digital media files are often compiled around the same point in time, such that the film and/or commercial spot is ready for airing in several countries at the same time.

To create a new version at a later time, the original material and the original project file must be obtained and altered. This may, however, be difficult to obtain, as e.g. the cooperation between a media file owner and a production company may have stopped or the production company may have closed in the meantime. Consequently, a new process of recording, processing and compiling may need to take place, which takes time and is economically costly.

Therefore, it remains a problem to provide a digital media file format, which allows a digital media file to be altered at a later stage and reduce the number of different compiled versions of the digital media file.

SUMMARY

According to a first aspect, the disclosure relates to a digital media file format, the media file format comprising a number of sections for storing information, said sections comprising a first section with compiled reproducible media content, and a second section comprising one or more media elements used during compilation of the compiled reproducible media content of the first section.

By the digital media file format comprising at least a first section and a second section, the format allows a digital media file to have a part, which can be rendered, e.g. displayed or played back, and a part comprising data not shown during rendering. Thereby, data may be embedded in a digital media file in the digital media file format, without affecting the rendering thereof.

By the second section comprising one or more media element used during compilation of the compiled reproducible media content of the first section, a further reproducible, compiled version of the media content can be made at any point based on a file of the digital file format comprising the original compiled version. This, in turn, reduces the risk of media files getting lost, e.g. due to loss of an original project, closing of the production company holding the originals, or the like. A digital media file in the digital media file format comprising a further reproducible, compiled version of the media content of the first section is in this text referred to as a variant of the file. The variant may be created later by generating a piece of compiled reproducible media content, replacing a previously generated piece of compiled reproducible media content in the first section of the media file. Correspondingly, the later generated piece of compiled reproducible media content may also be referred to as a variant.

As the content of a digital media file in the digital media file format may be altered at a later point in time, the digital media file format may throughout this text be referred to as an editable media file format. The media file format relates in some embodiments to a video file format. Thus, the media content may be video content, and the media elements may comprise video, image, graphic text, and/or audio data. At least a part of one of the one or more media elements of the second section may be used to generate the compiled reproducible media content of the first section.

Throughout this text, sections in the file format refers to data sections comprising media content, such as video data, photos, animations, audio, or the like. The media content of the first and/or second section may be of any compressed or uncompressed file format, e.g. common file formats such as an MPEG-file format, JPEG, FLV, SVG, WAVE, AAC, or the like. The digital media file format may thus comprise any content of any common digital media file format. The media elements of the second section may be raw data, such as recorded video from a digital video recorder, photos from a digital camera, digital audio sampled from a microphone, or the like. At least a portion of the media content of the second section, e.g. at least a part of a piece of video content of an MPEG-file format, may be used to generate the compiled reproducible media content of the first section of the file format. It will be clear to the skilled person how the compilation of media content from the second section is carried out, e.g. by suitable software. Consequently, this will not be described in further detail throughout this text.

It will, moreover, be clear throughout this text that where a digital media file format is described, the same applies to a digital media file in the digital media file format.

The first and second sections may furthermore comprise metadata related to the specific media content and/or media elements stored in these sections, for instance within the file format of the media content/elements. The skilled person will appreciate that metadata relating to the specific media elements may be embedded in the digital media file format in any suitable manner, such as stored in the file format of these media elements. This will, therefore, not be enlightened further throughout this text.

Metadata relating to the file format of the digital media file format may, however, be embedded in the first and/or second section.

The compiled reproducible media content of the first section may correspond to a digital media file of an existing digital media file format, such as the digital media file formats mentioned with reference to the media content of the second section. Metadata for the compiled reproducible media content of the first section of the digital media file format may be stored within this first section.

In some embodiments, the second section further comprises one or more additional media elements. The additional media elements may be media elements not used during compilation of the compiled reproducible media content of the first section. The additional media elements may be one or more of a video element, an image element, a text element, or an audio element. The additional media elements may be configured to allow a media editor to generate a second piece of compiled reproducible media content based on one or more of the additional media elements, potentially including one or more of the media elements.

In an embodiment, the first section is configured to be readable by a digital media renderer.

Consequently, the first section of the digital media file may be readable by any suitable media renderer, thus allowing for an easy rendering of the compiled reproducible media content of the first section of the digital media file format. The media content of the first section may thus correspond to any existing media and, e.g. by means of a header, index, or the like, of the first section and according to the existing digital media file format, resemble a digital media file of the existing digital media file format by means of the first section. In some embodiments, only the first section is readable by the digital media renderer.

The file extension of the digital media file format may, thus, be of any type indicating an existing file format, such as .jpg, .mov, .mp4, .mpeg, .avi, .wav, .mp3, or the like, corresponding to the existing file format, to which the media content of the first section corresponds, and allowing the digital media renderer to render the present file as a digital media file according to the existing file format.

The digital media renderer may thus be any digital media renderer, such as a media player, an image viewer, or the like. The digital media renderer, however, may differ from the digital media editor at least in that the digital media renderer cannot alter the digital media content of the first section of the digital media file. Some media renderers may, however, be able to adjust certain rendering parameters, such as lighting, playback speed for audio/video, or applying filters to the media content, without this is to be construed as altering the content of the media content of the first section. In some embodiments, the digital media renderer is a video player.

In some embodiments, the digital media file format and/or a media file in the digital media file format comprises a tail element. The tail element may be arranged at a final portion of the file and/or file format. For example, the tail element may be the last element of the media file and/or media file format, potentially. In some embodiments, the tail element may be arranged to be the first read element when the media file and/or media file in the media file format is read backwards, i.e. starting from the last bit of the media file.

The tail element may be comprised in the second section, potentially arranged after some or all media elements in the second section. Alternatively, the tail element may be arranged after the second section.

The tail element may be arranged adjacent to the second section. Potentially, the second section is arranged adjacent to and/or following the section. The tail element may be following the second section. In some embodiments, the tail element is arranged so as to form an ending portion of the media file format.

Additionally or alternatively, the tail element comprises one or more of: a length of the second section, a length of the first section, and/or a length of the digital media file format.

The tail element may be configured to allow a digital media editor to identify that a media file is in the editable digital media file format. The tail element may comprise a data structure, a data string, or the like, allowing the media editor to identify that the media file is in the editable digital media file format. For example, the tail element may comprise an identifier to allow the digital media editor to identify that the media file is in the editable digital media file format. The identifier may comprise one or more of a file length, a length of the second section and/or the first section.

In some embodiments, the digital media file format may comprise a header element arranged to form a starting portion of the media file format, the header element being configured to allow a digital media reader to read the compiled reproducible media content of the first section.

The header element may be corresponding to and/or may contain information about the media content of the first section, potentially only about the media content of the first section. Thereby, the media renderer may be allowed to read the first section in a manner similar to any known digital media file, such as an MPEG-file, a JPEG-file, or the like, thereby presenting the content of the first section as the media renderer would have done with any file of these file formats. Moreover, the editability may be maintained as the second portion of the file format is still within the file, even if it is not read and/or presented in the media renderer.

The header element may correspond to a format of the compiled, reproducible media content of the first section. In some embodiments, the header element may correspond to a media file format, which the compiled, reproducible media content of the first section is imitating. For instance, a digital media file in the digital file format may, to a media renderer, imitate being of any known media file format, such as MPEG4. The header element may allow the digital media file to imitate the known media file format, potentially by being configured to let the media renderer believe that the media file is of the known media file format.

In an embodiment, the second section further comprises an identifier element to allow a digital media editor to identify that a file is of said digital media format. Thereby, a digital media editor may be able to differentiate between compiled reproducible media files and files of the editable digital media file format. Consequently, a digital media editor may apply policies to editing of the compiled reproducible media content. For instance, when the digital media editor identifies that a file is of the present file format, it may prevent editing of the first section of the file, since the media element(s) used for compilation thereof may be found in the second section. This, in turn, may prevent modification of the compiled reproducible media content without the use of the original media elements. Where, for instance, the compiled reproducible media content is reduced in quality compared to the media elements, this reduces the risk of various versions of poor quality of compiled reproducible media content being made. In some embodiments, the identifier element is included in a tail element.

In another embodiment, the identifier allows the digital media editor to read the first and second sections. Consequently, the digital media editor may be able to read the media elements of the second section, used for generating the compiled reproducible media content of the first section. Thereby, the media editor may be able to create a new piece of compiled reproducible media content, alter the compiled reproducible media content of the first section, and/or create new versions of the compiled reproducible media content in a seamless manner. By using the media elements of the second section, the quality of a piece of later compiled reproducible media content may be at least similar to or higher than the quality of the previously compiled reproducible media content. Moreover, by having access to parts of the media elements, not used for the compilation of the previously compiled reproducible media content, any later compiled reproducible media content may easily be varied further by using other or additional parts of the media elements. Later generated pieces of compiled reproducible media content may replace a previously generated piece of compiled reproducible media content in the first section of the media file.

In some embodiments, the digital media editor may furthermore add additional media elements and/or remove existing media elements, such as elements no longer in use, from the second section.

By the digital media editor further being able to read the first section, any combination of the compiled reproducible media content and the media elements of the second section may be made. The media content of the first section may furthermore be included as a media element in the second section of the media file in the digital media file format and used for subsequent compilations of compiled reproducible media content. Moreover, the compiled reproducible media content may be replaced by later generated variants of the compiled reproducible media content, compiled using media elements of the second section.

In yet another embodiment, the identifier is further included in the file name. Thereby, a user of a piece of computer equipment may be able to immediately see by the file name of a digital media file, whether this is in the editable digital media file format. This, in turn, allows the user to open the file using an appropriate application, such as the media renderer or the media editor. The identifier may be a text string in the file name, delimited by punctuation, such as full stops, underscores, or the like, or may be a part of a text string including the name of the file. In some embodiments, the identifier precedes the file extension of the digital media file.

The identifier element may, moreover, be removed from a filename of the digital media file of the editable media file format, to allow the digital media file to be construed as a non-editable media file by the digital media renderer and/or by the operating system of a piece of computer equipment.

In an embodiment, the second section further comprises an identifier position element, which indicates the position of the identifier element.

By the second section comprising the identifier position element, a media editor will be able to identify the identifier element, even if this is a text string and is included in a filename, where a text string similar to the identifier element is used as (part of) the name, e.g. part of the name string. This, again, provides the user with a high degree of flexibility when naming a media file of the editable media file format, as the user need not avoid a text string including or similar to a string of the identifier element in the name of the file.

The identifier position element may indicate a position in bits in the name, and/or it may specify punctuation, and/or location thereof, indicating the beginning and/or the end of the identifier. The identifier position element may moreover specify a length of the identifier. In some embodiments, the identifier position element is of a specific byte length and located at a predetermined relative position, e.g. at the beginning or at the end, of the second section. Thereby, the identifier position element may be identified regardless of the file size, e.g. as the first element or last element, respectively, of the second section.

In yet another embodiment, the second section further comprises a cache element for caching compiled reproducible media content, different from the compiled reproducible media content of the first section.

Thereby, a second piece of compiled reproducible media content, which for instance may correspond to a variant of the compiled reproducible media content of the first section, may be presented to the user, fast and efficiently, i.e. without the need for a new compilation based on the media elements. When a user requests a variant of the compiled reproducible media content, the user may be provided with the compiled reproducible media content of the cache element, if this corresponds to the requested variant. Thereby the need for a new compilation is reduced, thus reducing the time and computational effort necessary to provide the user with the specific variant.

The second piece of compiled reproducible media content, cached in the cache element, may replace the compiled reproducible media content in the first section, when a user requests a variant corresponding to the second piece of compiled reproducible media content. In that case, the compiled, reproducible media content of the first section may be deleted and/or may switch place with the second piece of compiled reproducible media content, i.e. be cached in the cache element.

The cache element may have a fixed length in bytes or may be dynamically extendable to cache pieces of compiled reproducible media content of various lengths. The cache element may moreover be arranged at any suitable position in the second section, such as in the beginning, i.e. adjacent to the first section, at the end of the second section or in between any of the elements in the second section.

In some embodiments, the cache element is configured to cache media elements generated using one or more of the media elements of the second section and/or a compilation of one or more of said media elements, or the like.

In another embodiment, the second section is encrypted. Thereby, access to the media elements of the second section may be restricted, such that only persons authorised to access the media elements may gain access thereto. Thus, generation of another piece of compiled reproducible media content by an unauthorised person may be prevented. This, in turn, reduces the risk of unauthorised copies being generated from the media elements, when a digital media file in the digital media file format is made publicly available e.g. for streaming and/or download on a server.

The encryption may be based on an existing encryption technology, such as Advanced Encryption Standard (AES) of e.g. 128-bit or 256-bit, a Secure Hash Algorithm (SHA), Data Encryption Standard (DES), or the like. A password may be required to decrypt the second section, or a decryption key for encrypting and/or decrypting the second section may be included in a digital media editor.

In yet another embodiment, the second section further comprises a project element for use in compilation of a digital media file from the one or more media elements. The project element may for instance include corrections carried out in a media editor, such as filters, adjustments, effects applied to the one or more media elements or to the combination of these before compilation. Thereby, the combination of and/or the effects applied to the one or more media elements may be restored. The project element may similarly include compilation information of the compilation of the compiled reproducible media content from the one or more media elements.

The project element may, furthermore, comprise or correspond to a project file of a digital media editor. In some embodiments, the digital media editor may be able to open a media file of the editable media file format. Alternatively, or in combination therewith, the content including the project file of the second section of the editable media file may, e.g. by means of a first media editor, be extracted and/or saved separately and opened by a second media editor. The first media editor may, in this case, be a separate application or a plug-in in the second media editor for opening and/or extracting the content of the second section of the digital media file. Thereby, the second media editor may be any commercially available media editor and may not necessarily be adapted to read the second section of an editable media file of the editable media file format.

In another embodiment, the project element indicates a relative temporal position of the one or more media elements of the second section when compiling a digital media file. Consequently, the compiled reproducible media content may be recreated directly from the content of the second section of a media file of the editable media file format. This allows for later generation of compiled reproducible media content in an easy and seamless manner, as no reconstruction of timing or relative positioning of the various media elements during compilation. For instance, when only an audio track of a video or a closing image should be changed, this may be easily carried out by replacing only this part at the specific point in time and generating the compiled reproducible media content of the first section from this.

In yet another embodiment, the second section further comprises a table of contents indicating the position, name and length of the one or more media elements. Thereby, the media elements may be located easily by a digital media editor reading the content of the second section of a digital media file of the editable media file format. The position and length may, for instance, be indicated in bits, bytes, or the like. The table of contents may be located in the beginning of the second section, allowing this to be the first element to be read in the second section.

In an embodiment, the second section further comprises a data element, the data element indicating a plurality of predetermined digital media file variants, compilable from the one or more media elements of the second section. Thereby, several variants of a media file of the editable file format may be generated from one media file of the editable media file format. This, in turn, allows for easy management of several variants of a media file, since these may all be included in one media file. In this case, the media file needs not comprise all the various pieces of compiled reproducible media content of the first section, but may instead generate compiled variants upon request, thereby reducing the needed storage space compared to when having to store a number of compiled reproducible variants of media files having respective first sections with different pieces of compiled reproducible media content, as well as the media elements.

The variants of the digital media file may, for instance, relate to photos with various filters applied, or various light settings, videos with different audio tracks, such as audio tracks having different languages, e.g. commercial spots adapted for different markets, an audio track of different mixes and/or masterings, or the like.

The data element may, for instance, correspond to a JSON-file, CSV-file, a spreadsheet-file (such as an XLS-file), a TXT-file, or the like. The data element may thus comprise a number of entries, each corresponding to parameters, which may be used in the compilation of a variant. In some embodiments, the data element can be represented as a table having a number of columns, each corresponding to a parameter type, and a number of rows with values for each parameter type. Each row may thus correspond to a set of parameters.

The data element may cause the project file to be run and generate a media file variant using a predefined set of parameters defined in the data file. The set of parameters may in some embodiments be defined or re-defined during editing of the content of the second section of an editable media file of the editable file format by means of a digital media editor.

The compiled reproducible media content of the first section of an editable media file of the editable media file format may, for instance, be a first piece of compiled reproducible media content. Another set of parameters may, for instance, be selected by a user by inserting a string of text, or the like, in a URL of the digital media file, when the digital media file is accessible on e.g. a server. Alternatively, a parameter may be passed, when the file is opened for rendering by a media renderer. The parameter may indicate a variant comprising a second piece of compiled reproducible media content to be generated and shown.

The second piece of compiled reproducible media content of the first section of the variant of the file may be generated from the same and/or additional or other media elements from the second element as the first piece of compiled reproducible media content of the first section. In some embodiments, media elements not included in the second section may be used to generate the second piece of compiled reproducible media content. The location and/or an identifier of the media elements necessary to generate the second piece of compiled reproducible media content may be specified in and/or by the data element. In some embodiments, selecting a variant by means of the data element may cause the media content of the first section to be replaced by the second piece of compiled reproducible media content corresponding to the selected variant.

According to a second aspect, the disclosure relates to a digital media file in the digital media file format according to the first aspect.

The digital media file may consequently be renderable in a digital media renderer in a similar way as a non-editable media file, whilst the media elements are included in the file and may be accessed by a digital media editor. Such a media file may be provided to end users. The media file may be a video file, such as a promotion video, a commercial spot, or the like. If a new version, i.e. a variation of the video needs to be made at a later point in time, e.g. months or years after the production of the first version, all the elements used to make the existing version are stored in the file used for playback. Thereby, the end user may provide a supplier, such as a production company, with the editable media file, thereby allowing them to develop further on the existing version. This, again, makes the end user less vulnerable to the closing of a production company, or the like, and reduces the risk of the media elements getting lost, as these are included in the playable media file. The skilled person will appreciate that this similarly applies to other types of digital media, such as photos or audio.

According to a third aspect, the disclosure relates to a computer-readable medium comprising a digital media file in the digital media file format according to the first aspect.

The computer-readable medium may comprise a file in the digital media file format according to the first aspect.

According to a fourth aspect, the disclosure relates to method for creating a digital media file in the digital media file format according to the first aspect, comprising the steps of: (1) providing a first section of the media file comprising a compiled reproducible media content; (2) providing, following the first section, a second section of the media file comprising one or more media elements used when compiling the compiled reproducible media content of the first section; and (3) generating a second piece of compiled reproducible media content using one or more of the one or more media elements of the second section used during compilation of the first piece of compiled reproducible media content.

Consequently, the file may be created in an easy manner by allowing the second section comprising the media elements to be arranged directly or indirectly after the first section comprising the compiled reproducible media content. This, in turn, may reduce the computational effort required for generating such an editable media file of the editable media file format. In some embodiments, the editable digital media file may be generated simultaneously with the compilation of the compiled reproducible media content of the first section of the file. The editable digital media file may, moreover, be generated by a digital media editor, such as an editing software. In some embodiments, the editable media file may be generated by a second digital media editor based on the compiled reproducible media content compiled by a first digital media editor. The second digital media editor may then be configured to read both the first and the second sections of the file. The second digital media editor may, alternatively or in combination therewith, be provided as a plug-in in the first digital media editor.

Moreover, by generating the second piece of compiled reproducible media content from the one or more media elements, the second piece of compiled reproducible media content may be of the same quality as the first piece of compiled reproducible media content. If the first piece of compiled reproducible media content, for instance, is reduced in quality compared to the media elements, the second piece of compiled reproducible media content may be of the same quality as the first piece of compiled reproducible media content, or as the media elements.

In some embodiments, the digital media file in the digital file format is stored on a server. The second section of the media file may comprise a data element indicating a plurality of predetermined digital media file variants compilable from the one or more media elements of the second section. The method may further comprise the step of, prior to the step of generating the second piece of reproducible media content, requesting a variant of the digital media, by means of a URL, which indicates the name and file extension of the digital media file. The step of generating the second piece of reproducible media content may comprise generating the second piece of reproducible media content based on the requested variant.

In some embodiments, the variant of the digital media file is requested by appending a string to the file extension in the URL, the string indicating the requested variant of the digital media file.

According to a fifth aspect, the disclosure relates to a method of obtaining a variant of a digital media file in the digital media file format according to the first aspect from a server, on which the digital media file is stored, the method comprising the steps of: (1) providing, on the server, a digital media file according to any one of the preceding claims; and (2) requesting a variant of the digital media file by a client, by means of a URL, which indicates the name and file extension of the digital media file; wherein the variant of the digital media file is requested by appending a string to the file extension in the URL, the string indicating the requested variant of the digital media file.

This, in turn, allows for generating variants at the same time as they are requested while only needing to store one file on the server. Thereby, storage space may be saved, and the maintenance of hyperlinks on a website may be easier, as only one file is needed.

The first section of the original media file, from which a variant may be obtained, may comprise a first piece of compiled reproducible media content. The variant may be a digital media file in the digital media file format, wherein the first section comprises a second piece of compiled reproducible media content instead of the first piece of compiled reproducible media content. In some embodiments, the second sections of the original media file and the variant thereof are the same. In some embodiments, the server generates the variant of the digital media file, after this is requested, and provides this. The variant may be generated from the media elements of the second section of the original media file.

The digital media file may be renderable through a frame, a built-in viewer, or the like of a website. The URL may, consequently, either be entered manually in the address bar or may be called by means of a drop-down menu or the like on a website, in the frame, the viewer, or the like. Alternatively, the server may be configured to choose an appropriate version to the user, requesting access to the media file by appending the string on the URL of the media file, when accessing the media file.

The string may be a pure text string or may include a number of punctuation marks, or it may use punctuation to delimit the string, or the like. The string may be one or more words referring to a content difference between the different variant (such as two-letter abbreviations for languages, words describing various elements of the content to be replaced or added, or the like), or may include or be a digit referring to a variant number. Alternatively, or in combination therewith, the string may comprise a location of a media file or element to be used in the compilation of compiled reproducible media content of a variant, e.g. in a case where the media file or element is not included in the second section of the media file of the media file format according to the disclosure. In some embodiments, an identifier element, indicating that the media file is of the editable media file format, may be included in the URL to indicate to the server that a variant should be provided.

According to a sixth aspect, the disclosure relates to system for providing a digital media file in the digital media file format according to the first aspect, the system comprising: a server, on which the digital media file is stored, and running a digital media editor; and a client configured to request from the server, a variant of the digital media file by means of a URL, which indicates the name and file extension of the digital media file; wherein the variant of the digital media file is requested by appending a string to the file extension in the URL, the string indicating the requested variant of the digital media file.

The client may here be a piece of computer equipment, such as a personal computer, a smartphone, a tablet computer, a server, or the like, capable of rendering or transmitting the digital media file. The original media file and the variants thereof may be as described with respect to the fifth aspect.

The different aspects of the disclosure can be implemented in different ways including as an editable media file format, an editable media file, a method for creating an editable digital media file, a method for obtaining a variant of a digital media file, and a system for providing an editable digital media file, as described above and in the following, each yielding one or more benefits and advantages described in connection with at least one of the aspects described above, and each having one or more embodiments corresponding to the embodiments described in connection with at least one of the aspects described above.

Furthermore, it will be appreciated that embodiments described in connection with one of the aspects described herein may equally be applied to the other aspects.

BRIEF DESCRIPTION OF THE DRAWINGS

The media file format, media file, system, and methods will now be described in greater detail based on non-limiting exemplary embodiments and with reference to the drawings, of which.

All of the figures are schematic, not necessarily to scale, and generally only show parts which are necessary to elucidate embodiments of the present inventive concept. Other parts may be omitted or merely suggested. Similar reference numerals will in the following be used for similar features in different embodiments.

DETAILED DESCRIPTION

Figure 1:
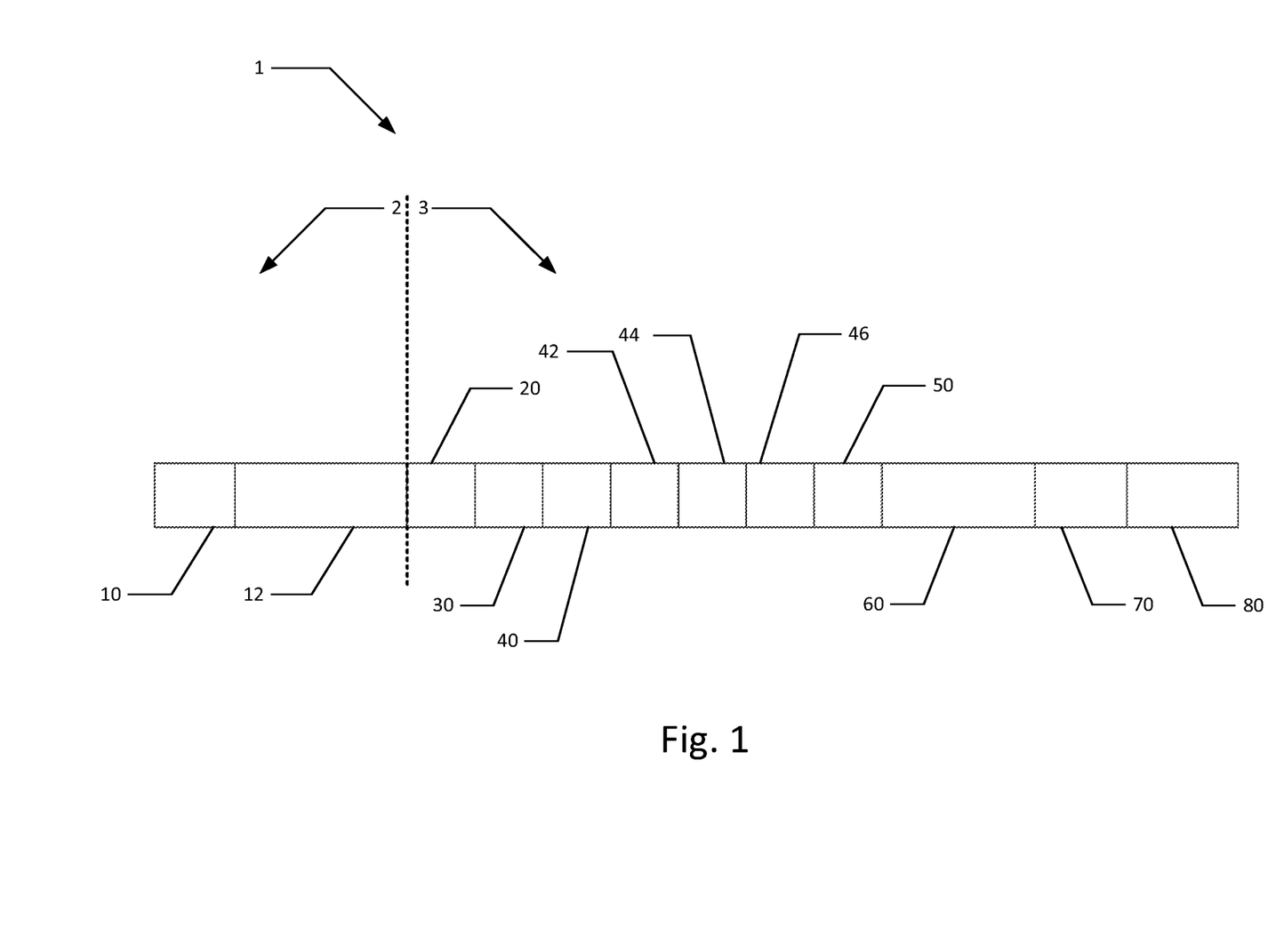
FIG. 1 shows an overall schematic view of a digital media file of an embodiment of the digital media file format according to the disclosure.

FIG. 1 shows an overall schematic view of a digital media file 1 of an embodiment of the digital media file format according to the disclosure. The digital media file 1 comprises a first section 2 comprising compiled reproducible media content, and a second section 3. The compiled reproducible media content of the first section 2 is a video and comprises a file header element 10 and a master element 12, comprising the essence, i.e. coded video and audio, of the compiled reproducible media content. In another embodiment, the reproducible media content may be another type of media, e.g. an image, such as a digital photograph, audio, animations, or the like.

The master element 12 comprises a video element, corresponding to the essence of a video file, which may be encoded according to any existing video codec, lossy, or lossless, such as an MPEG-codec, e.g. MPEG-2 or MPEG-4, a H.264-codec, or the like. The master element 12 may, thus, correspond to the essence of a video file according to an existing video file format, such as QuickTime File Format, MPEG-4, MPEG-1, MPEG-2, M4V, MaterialExchange Format, Windows Media Video, AVI, or the like. In a similar manner, the master element 12 may in other embodiments, where the compiled reproducible media content is another type of media, correspond to the data content of an existing file format of that type of media, for instance JPEG, PNG, GIF and/or TIFF for images, WAVE, MPEG-3, M4A and/or AIFF for audio. In some embodiments, the master element 12 further comprises metadata relating to the master element 12 itself and/or comprises a further header element, footer element, or the like.

The file header element 10 comprises metadata relating to the master element 12, including inter alia the length of this. The file header element 10 moreover corresponds to the master element 12, such that the header element 10, when the master element 12 corresponds to the essence of a media file of a given existing digital media file format, corresponds to a file header, file footer, or the like of the same existing digital media file format. The file header element 10 and the master element 12 may thereby be read by a media renderer as one digital media file of the given existing digital media file format, regardless of the second section 3. Consequently, the editable digital media file 1 may comprise a file extension corresponding to an existing file extension for the digital media file of the given existing digital media file format.

The file header element 10 is in FIG. 1 shown as the beginning of the first section 2 but may in another embodiment may located after data element 12. In other embodiments, the first section 2 may comprise several data elements, which are arranged consecutively and/or with one or more header elements arranged in between these.

The first 2 and second sections 3 are sequential within the digital media file 1, i.e. not separated by separation elements, empty elements, e.g. elements not as such comprising data, or the like. The second section 3 thus appears appended to the first section 2, and the transition between the first 2 and second section 3 is, thus, determined by the file header element 10 indicating the length of the data element 12 of the first section. In another embodiment, a separation element and/or an empty element may be arranged between the first 2 and the second section 3.

The second section 3 comprises a number of media elements 40, 42, 44, 46, comprising media content used to compile the compiled reproducible media content, i.e. the header 10 and the master element 12, of the first section 2. Not all media elements 40, 42, 44, 46 need necessarily be used to compile the header 10 and master element 12, and in some cases, only parts of one or more of the media elements 40, 42, 44, 46 are used for the compilation. The media elements 40, 42, 44, 46 may comprise various types of media content and may hence be a video media element 40, an audio media element 42, an image media element 44, and/or a graphic text element 46. The media elements 40, 42, 44, 46 may correspond to individual media files used for compiling the compiled reproducible media content of the first section 2. The media elements 40, 42, 44, 46 may, regardless of the type of media content that they each comprise, be arranged in any order within the second section 3.

The second section 3 further comprises a project element 20 and a data element 30. The project element 20 comprises at least information about temporal positions of the media elements 40, 42, 44, 46 as well as which of the media elements 40, 42, 44, 46 that should be used for the compilation of the compiled reproducible media content. The project element 20 may correspond to the project file of a digital media editor, such as a project file of a digital media editor. Such project files may, for instance be project files from a video editor, a graphics editor, an audio editor, or the like. In another embodiment, the project element 20 may comprise additional information to the temporal positions of any one or more media element 40, 42, 44, 46 used for compilation, or it may comprise other types of information for use when compiling the compiled reproducible media content to thus create a variant. Such information may, for instance, be lighting adjustment settings, volume, playback speed, or the like, where applicable to one or more of the media elements 40, 42, 44, 46.

The data element 30 comprises a number of predefined sets of parameters for use by the project element 20 upon compilation. For instance, the data element may in a first set parameters indicate that upon compilation of the compiled reproducible media content, the video media element 40 should be combined with the audio 42 element from a first to a second point in time and with the graphic text element 46 from the first to a third point in time. The project element 20 will then, upon compilation based on the first set of parameters, adapt the temporal position of the media elements 40, 42, 46 based on this. A second set of parameters may, for instance, instead indicate that the video media element 40 should be combined with the image media element 44 instead of the graphic text element 46, from the first point in time to the third point in time. If the compilation is then based on the second set of parameters, the project element 20 will adapt the temporal position of the media elements 40, 42, 44 upon compilation.

Each set of parameters may have an identification, such as a unique name or number. The set of parameters from the data element 30 to be used for compilation may be chosen upon compilation, for instance by passing to the digital media editor or the software, which compiles and/or generates the compiled reproducible media file, the unique name or number of the specific set of parameters. This may, for instance, be done within a URL, when the editable digital media file 1 is available for access on a server. A string indicating the desired variant may be included in the URL, and in some embodiments following to the file name of the editable digital media file 1.

The editable digital media file 1 moreover comprises an identifier element 50, following the media elements 40, 42, 44, 46 and an identifier position element 80 at the end of the second section 3. The identifier element 50 allows a digital media editor to recognise the editable digital media file 1 as an editable digital media file. The identifier element 50 may for instance comprise a specific string of text, such as "edit", one or more punctuation marks, or the like. Similarly, the identifier element 50 may be included in the file name of the editable media file 1 to make the file identifiable by a user as an editable media file. The identifier element 50 may be surrounded by punctuation marks. In some embodiments, the identifier element 50 may be of a fixed size, such as 2 bytes, 4 bytes, 6 bytes, 8 bytes, or the like.

The position of the identifier element 50 is indicated by an identifier position element 80. The identifier position element 80 may indicate the position of the identifier element 50 by specifying a starting position, e.g. in bits or bytes from the beginning or the end of the file 1 or from the beginning of the second section 3. In the embodiment of the editable media file 1 as shown in FIG. 1, the identifier position element 80 has a predetermined length of 16 bytes. In other embodiments, the identifier position element 80 may have another predetermined length, such as less than 16 bytes or more than 16 bytes, or it may be of a variable length. As shown in FIG. 1, the identifier position element 80 is arranged as the last element of the second section 3. Thereby, the identifier position element 80, of a file of this format, may be read as the last 16 bytes of the file 1, thus allowing a digital media editor to locate the identifier element 50 and thereby identify that the file 1 is of the editable media file format. In case of a long digital media file 1, the identifier position element 80 may be longer. In some embodiments, the length of the identifier position element 80 may be dynamic and/or depend on the length and/or size of the digital media file 1.

The second section 3 of the editable media file 1 moreover comprises a table of contents element 70 and a ToC length element 60, indicating the length of the table of contents element 70. The table of contents element 70 comprises indicators of at least the positions and lengths of each of the source files 40, 42, 44, 46. The position and length of each of the source files 40, 42, 44, 46 may be indicated in the table of contents element 70 relative to the beginning of the file 1, the beginning of the second section 3, and/or from the end of the second section 3.

The ToC length element 60, which indicates the length of the table of contents element 70, is in FIG. 1 of a predetermined length of 4 bytes and arranged adjacent to the identifier element 50. In some embodiments, the predetermined length of the ToC length element 60 may be less than 4 bytes or more than 4 bytes or may be variable. In some embodiments, the ToC length element 60 further indicates the position of the table of contents element 70 instead of or in combination with indicating the length of the table of contents element 70.

Figure 2:
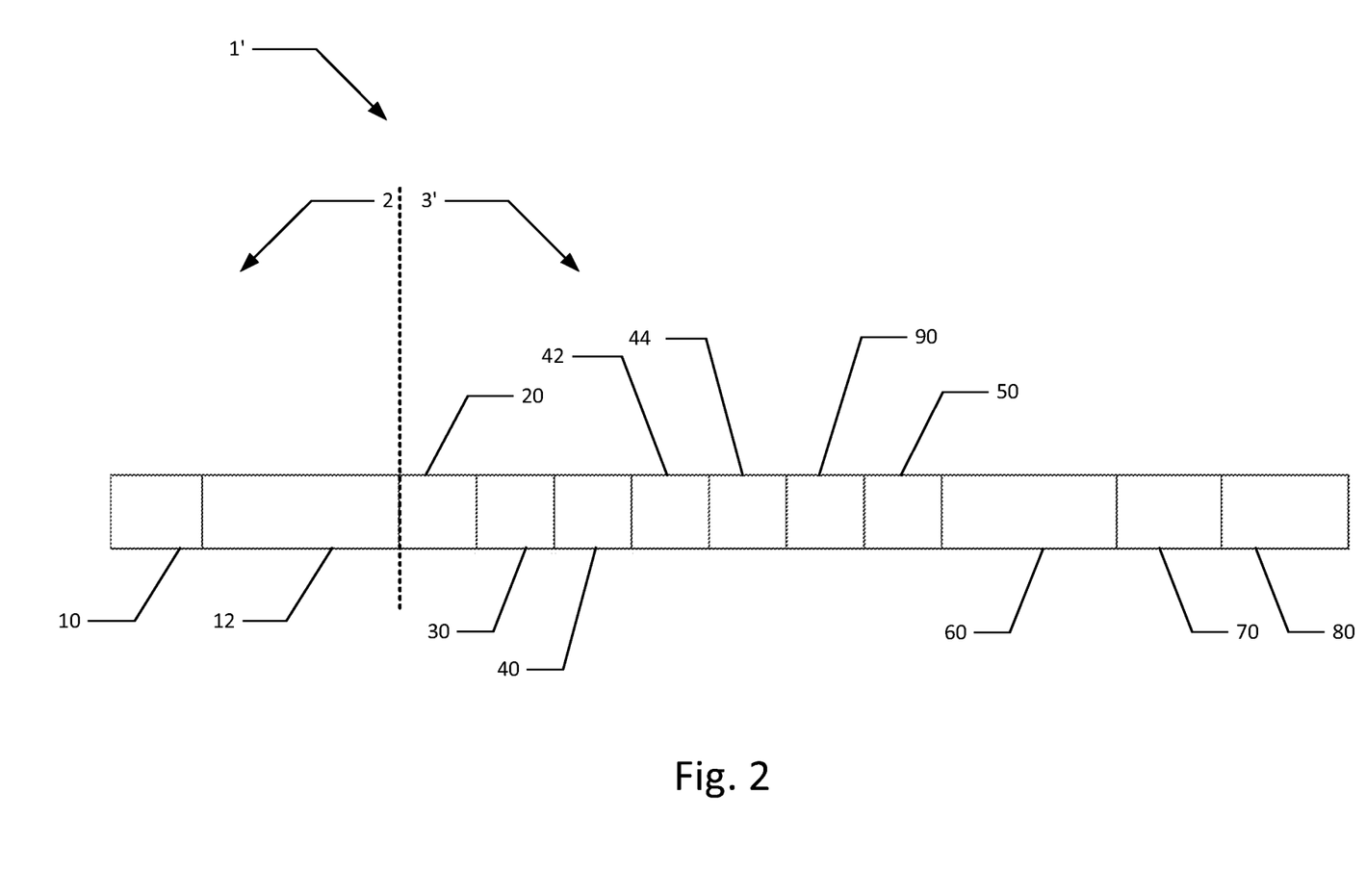
FIG. 2 shows an overall schematic view of digital media file of an embodiment of the digital media file format according to the disclosure.

FIG. 2 shows an overall schematic view of digital media file 1' of another embodiment of the digital media file format according to the disclosure. The digital media file 1' comprises a first section 2 similar to the digital media file shown in FIG. 1, having a header element 10 and a master element 12. The second section 3' of the digital media file 1', however, comprises a project element 20, a data element 30, media elements 40, 42, 44, an identifier element 50, a ToC length element 60, a table of contents element 70, and an identifier element 80, as described with reference to the digital media file 1 of FIG. 1.

The second section 3' of the digital media file 1' in FIG. 2 further comprises a cache element 90. The cache element 90 is configured to cache a piece of compiled reproducible media content, compiled at least in part from the media elements 40, 42, 44 of the second section 3'. The compiled reproducible media content of the cache element 90 may, similar to that of the first section 2 of the digital media file 1', comprise a header element and a master element (not shown in FIG. 2). The compiled reproducible media content of the cache element 90 further corresponds to a variant of the compiled reproducible media content, which may be generated using the parameters of the data element 30. In another embodiment, the compiled reproducible media content of the cache element 90 corresponds to a variant, which may be generated by passing parameters, such as parameters different from those of the data element, to video editor. Such parameters may e.g. be passed in the URL of the digital media file 1' when stored on a server.

The cache element 90 of FIG. 2 is arranged after the media elements 40, 42, 44 but may in another embodiment be arranged at another position within the media file. The length of the cache element 90 is furthermore chosen in the digital media file 1' to correspond to the compiled reproducible media content cached by the cache element 90. In other embodiments, the cache element may be longer or shorter and/or may be dynamically extendable depending on the compiled reproducible media content, which the cache element 90 is to cache.

Figure 3:
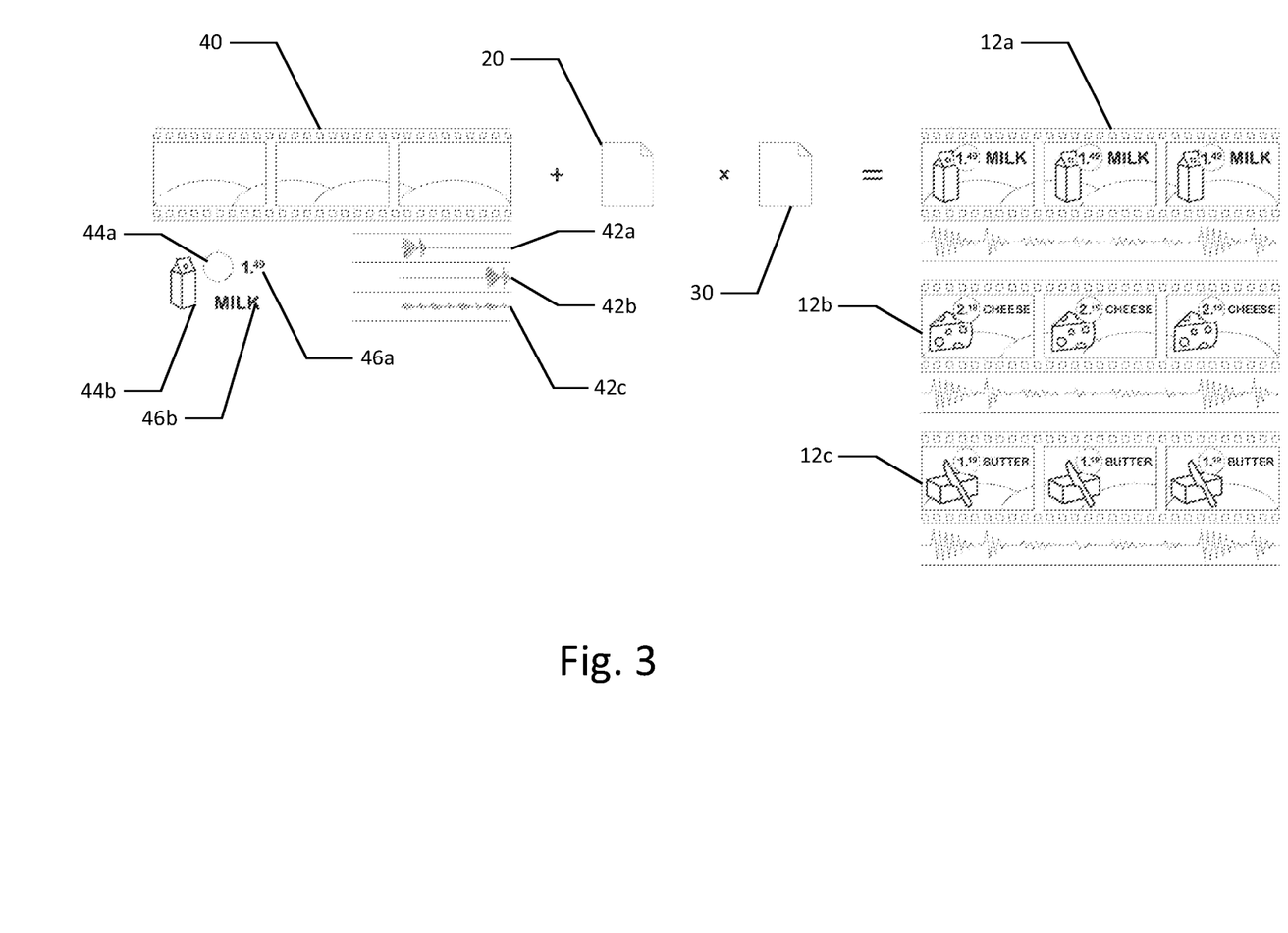
FIG. 3 shows a schematic view of a generation of variants of compiled reproducible media content of a digital media file of an embodiment of the digital media file format according to the disclosure.

FIG. 3 shows a graphical illustration of an example of how various media elements 40, 42a-42c, 44a, 44b, 46a, 46b may be combined into different master elements 12a-12c within an editable media file of the editable media file according to the disclosure. As shown in FIG. 3, the project element 20 and the data element 30 are used for generating the compiled reproducible media content.

The first 12a, second 12b and third master elements 12c, as shown in FIG. 3, are video master elements and each have corresponding header elements (not shown in FIG. 3). These may be generating during the same or a later process of generating the variants. The header elements and corresponding master elements 12a-12c may correspond to a video media file of any existing video file format. In another embodiment, the master elements 12a-12c may be different types of master elements, such as audio master elements or image master elements, having corresponding header elements.

In FIG. 3, the second section of the digital media file comprises one video media element 40, three audio media elements 42a-42c, two image media elements 44a, 44b, two graphical text media elements 46a, 46b, as well as the project element 20 and the data element 30. Based on a first set of parameters of the data element 30, the project element 20 is adapted to specify that the video media element 40, the three audio media elements 42a-42c, the two image elements 44a, 44b, and the two graphical text media elements 46a, 46b are to be used for the generation of the first master element 12a. Thus, the project element 30 specifies the temporal position of these media elements 40, 42a-42c, 44a, 44b, 46a, 44b, according to the first set of parameters of the project element 20.

The project element 30 here, moreover specifies the positions and sizes of the media elements 40, 44a, 44b, 46a, 46b relative to one another in the first master element 12a based on the first set of parameters of the data element 30. In another embodiment, the positions and sizes of the media elements 40, 44a, 44b, 46a, 46b relative to one another in the first compiled reproduced video media element 12a may be fixed in the project element 20, i.e. not alterable by parameter sets of the data element 30.

Thereby, the first master element 12a may be generated, when the first set of parameters are selected from the data element 30. The selection of the parameters may be carried out in any suitable way, such as, for instance, by choosing by a digital media editor, the parameter set, or by appending an indication of the desired parameter set to a URL of a digital media file in the digital media file format on a server.

Similarly, the master elements 12b or 12c, respectively, may be generated when a second or third set of parameters, respectively, are selected from the data element 30. To generate the second 12b and third master elements 12c, different media elements 40, 42a-c, 44a, 44b, 46a, 46b are selected and combined by the project element 20.

Figure 4:
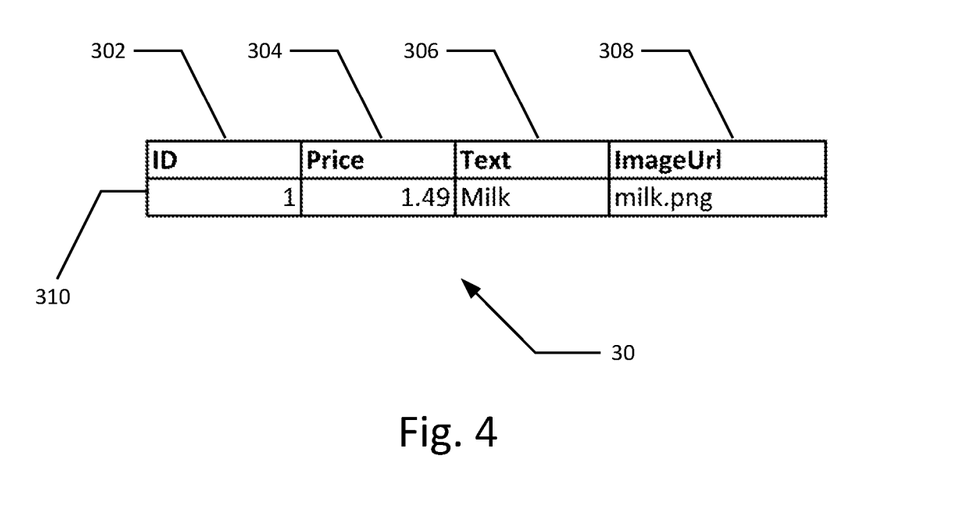
FIG. 4 shows an example of a data element of the digital media file shown in FIG. 3.

FIG. 4 shows an example of a data element 30 of the digital media file shown in FIG. 3. The data element 30 is in FIG. 4 illustrated as a table but may alternatively be illustrated as a text string separated by punctuation or the like. The data element 30 comprises four parameter types 302, 304, 306, 308, relating to the parameter types ID, Price, Text, and ImageUrl, respectively. In other embodiments, the data element 30 may comprise fewer or more columns, which may relate to other parameter types. The parameter types indicate certain features of, such as objects in, the compiled reproducible media content, which may be changed and recompiled to generate a variant of the compiled reproducible media content.

The data element 30 further comprises a parameter set 310 having values for each of the parameter types and arranged as a row in the data element 30. As shown in FIG. 4, the value of the parameter type ID 302 may be used as an identifier of the parameter set. Specifying that the ID-parameter value should be equal to one will thus lead to a compilation of the compiled reproducible media content, wherein the Price-parameter has the value "1.49", the Text-parameter has the value "Milk" and the ImageUrl-parameter has the value "milk.png". As seen in FIG. 3, these values correspond to the media elements 46a, 46b, and 44b, respectively, in the digital media file. In other embodiments, the values in the data element 30 may correspond to and/or indicate the location of media elements not in the digital media file.

When specifying the ID-parameter equal to one, the data element 30 may thus be used to generate the master element 12a. A digital media file, for exemplary purposes named "ad.mp4" here, may be located on a server and be addressable by the URL:

http://someserver/getvideo?file=ad.mp4

In this case, it may be indicated by means of an identifier string of the identifier element 50 (shown in FIGS. 1 and 2), that this is a digital media file of the editable digital media file format. In the present example, the identifier may be the string "edit", which is inserted in the file name, allowing the editable media file to be addressed by the URL:

http://someserver.getvideo?file=ad.edit.mp4

To provide a user with the master element 12a (shown in FIG. 3) in the first section of the digital media file, the ID-parameter equal to one may be passed as:

http://someserver.getvideo?file=ad.edit.mp4&ID=1

This may cause a media editor to compile the master element 12a which corresponds to the parameter set corresponding to the ID-parameter being equal to one, and arrange this in the first section of the digital media file. Alternatively, if a variant, i.e. compiled reproducible media content, corresponding to the master element 12a is cached in the cache element 90, the media editor may arrange the variant from the cache element 90 as the master element 12a in the first section to provide this to the user.

Alternatively, or in combination therewith, specific parameter values of the parameter types of the data element 30 may be specified to generate other variants not necessarily corresponding to parameter sets of the data element 30. For instance, the master elements 12b and 12c (shown in FIG. 3) may be selected for compilation and arrangement in the first section. This may be done by specifying parameter values corresponding to one or more of the parameters 302, 304, 306, 308 in the URLs. For instance, the parameter values for the parameter types Price 304, Text 306 and ImageUrl may be specified in the URLs to generate master elements 12b and 12c, respectively:

http://someserver/getvideo?file=ad.edit.mp4&Price= 2.19&Text=Cheese&ImageUrl=someserver/ cheese.png http://someserver/getvideo?file=ad.edit.mp4&Price= 1.19&Text=Butter&ImageUrl=someserver/butter.png.

In some embodiments, the parameter values passed in the URL may be stored in the data element 30. An ID-parameter value or the like may furthermore be passed to and stored in the data element 30 or the data element 30 may provide the ID-parameter value. Moreover, a variant may be generated using a parameter set, e.g. having the ID-parameter value of one, of the data element 30, wherein additional parameters not included in the parameter set, or wherein one or more of the parameter values of the parameter set is replaced. For instance, a variant (not shown in FIG. 3) may be generated, wherein the Text-parameter has the value "Milk", the ImageUrl has the value "milk.png" but wherein a Price-parameter has a value of "2.09" by specifying the URL:

http://someserver/getvideo?file=ad.edit.mp4& ID=1&Price=2.09

The parameter value (i.e. the Price-parameter value) passed in the URL may replace the parameter value of the data element 30 in the row 310 corresponding to the ID-parameter specified in the URL (i.e. ID-parameter equals one).

Figure 5:
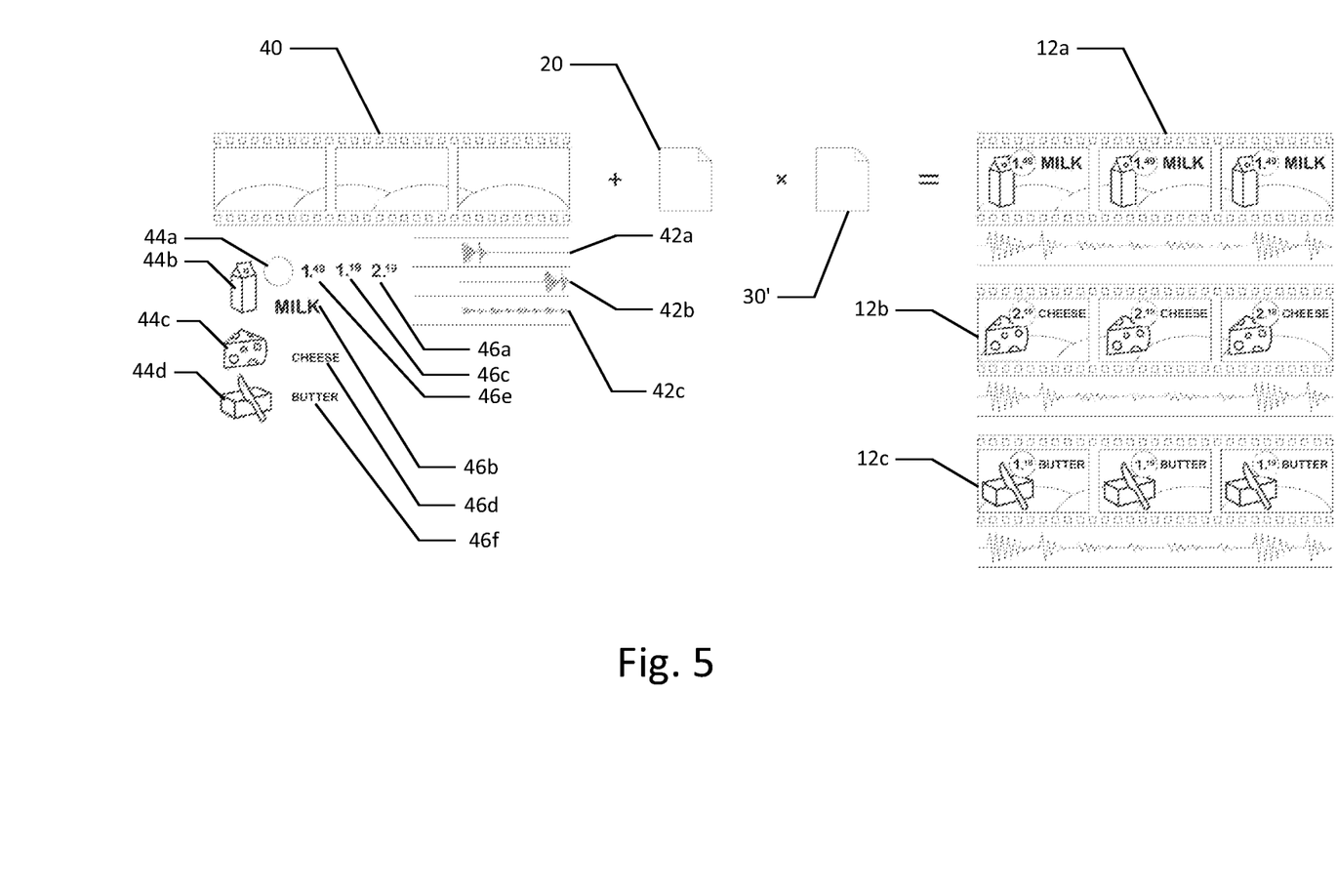
FIG. 5 shows a schematic view of a generation of variants of compiled reproducible media content of a digital media file of an embodiment of the digital media file format according to the disclosure.

In FIG. 5, a schematic view of a generation of master elements 12a, 12b, 12c corresponding to variants of a digital media file is shown. The master elements 12a, 12b, 12c correspond to those of the embodiment shown in FIG. 3. In FIG. 5, however, the digital media file further comprises the image media elements 44c, 44d and text media elements 46b-46f used to generate the master elements 12a, 12b, 12c. The digital media file shown in FIG. 5 further comprises a data element 30'.

Figure 6:
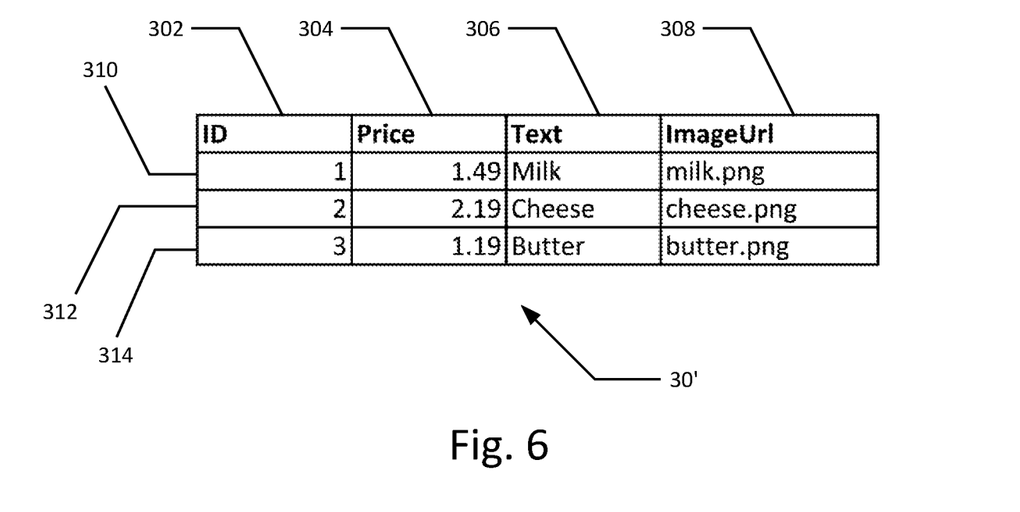
FIG. 6 shows an example of a data element of the digital media file shown in FIG. 5.

The data element 30' comprises, as shown in FIG. 6, four parameter types 302, 304, 306, 308, as well as a parameter sets 310 like the data element 30 shown in FIG. 4. The data element 30', however, further comprises two additional parameter sets 312, 314, each arranged in a row in the data element 30'. The three master elements 12a, 12b, 12c, shown in FIG. 5, may thus be generated by means of the data element 30' and the media elements 40, 42a-c, 44a-d, 46a-f comprised in the second section of the digital media file shown in FIG. 5. The ID-parameter as well as other parameters may be specified, altered, or the like, as described with respect to the data element 30. It will furthermore be appreciated that the parameter types 302, 304, 306, 308 and the ID-parameters may be arranged in any order within the data elements 30, 30'.

It will furthermore be appreciated by the skilled person that the data elements 30, 30' may comprise any number of sets of parameters and that the second section of the editable media file may comprise any number of media elements.

Figure 7:
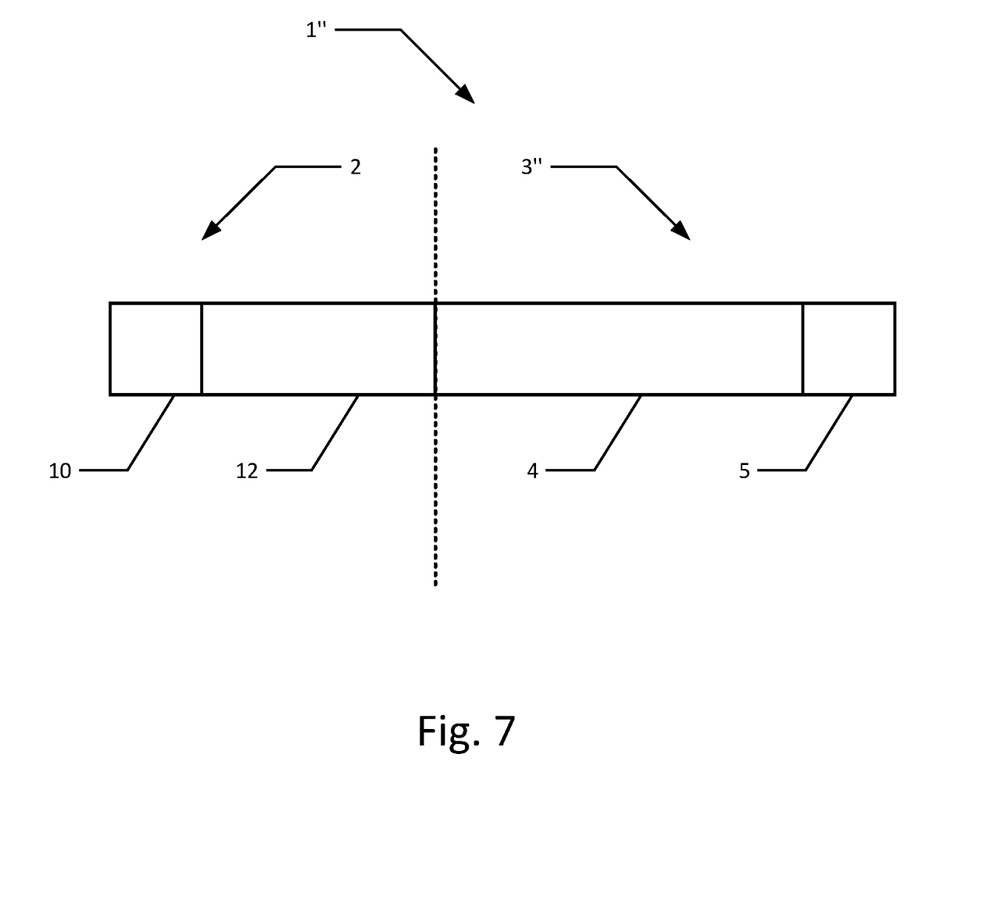
FIG. 7 shows an overall schematic view of a digital media file of an embodiment of the digital media file format according to the disclosure.

FIG. 7 shows an overall schematic view of a digital media file of an embodiment of the digital media file format 1". The digital media file format 1" comprises first section 2 comprising compiled reproducible media content having a header element 10 and a master element 12. The first section 2 as well as the header element 10 and master element 12 thereof may be as described above with reference to the digital media file formats 1, 1'. The first section 2 is configured to be readable by a digital media renderer, such that the first section 2 can be read by a media renderer in a manner similar to a media file consisting of the first section 2.

The digital media file format 1" moreover comprises a second section 3" configured to be readable by a media editor. The second section 3" may be configured not to be readable by a media renderer. The second section 3" comprises a data portion 4 and a tail element 5. The data portion 4 may comprise any number of elements and any combinations of media elements 40, 42, 44, 46, project elements 20, data elements 30, identifier elements 50, identifier position elements 80, table of contents elements 70, ToC length elements 60, and/or cache elements 90, as described with respect to the second sections 3, 3' of the digital media file formats 1, 1'.

The tail element 5 is configured such that a media editor can identify that a media file is in the media file format 1" by reading the file starting from the tail element 5, i.e. backwards, rather than starting from the header element 10 as a media renderer is configured to do. The tail element 5 comprises an identifier that the media file is in the media file format 1". The tail element 5 further comprises a length of the second section 3" as well as a length of the data portion 4.

The first 2 and second sections 3" are arranged adjacent to each other. The first 2 and second section 3" are sequential as described with respect to the media file formats 1, 1'.

Although some embodiments have been described and shown in detail, the media file format, media file, system and methods are not restricted to them, but may also be embodied in other ways within the scope of the subject matter defined in the following claims. In particular, it is to be understood that other embodiments may be utilized and structural as well as unction modifications may be made without departing from the scope of the disclosure. It should furthermore be emphasized that the term "comprises"/"comprising", when used in this specification, is taken to specify the presence of stated features, integers, steps or components but not preclude the presence or addition of one or more features, integers, steps, components, or groups thereof.

The invention claimed is:

1. A computer-implemented method for creating a digital media file in a digital media file format, comprising the steps of:

providing a first section of the digital media file comprising a first piece of compiled reproducible media content, providing, following the first section, a second section of the digital media file comprising one or more media elements used during compilation of the compiled reproducible media content of the first section, wherein the second section further comprises at least one further media element, and generating a second piece of compiled reproducible media content using one or more of the one or more media elements of the second section used during compilation of the first piece of compiled reproducible media content, wherein:

the digital media file in the digital file format is stored on a server;

the second section of the media file comprises a data element indicating a plurality of predetermined digital media file variants compilable from the one or more media elements of the second section; and the method further comprises the steps of:

prior to the step of generating the second piece of reproducible media content, requesting a variant of the digital media, by means of a URL, which indicates the name and file extension of the digital media file;

wherein the step of generating the second piece of reproducible media content comprises generating the second piece of reproducible media content based on the requested variant.

2. A method according to claim 1, wherein the variant of the digital media file is requested by appending a string to the file extension in the URL, the string indicating the requested variant of the digital media file.

3. The method according to claim 1, wherein the first section is configured to be readable by a digital media renderer.

4. The method according to claim 1, wherein the digital media file further comprises a tail element, the tail element being configured to allow a digital media editor to identify the digital media file format.

5. The method according to claim 4, wherein the tail element is arranged adjacent to the second section.

6. The method according to claim 4, wherein the tail element is arranged so as to form an ending portion of the digital media file.

7. The method according to claim 4, wherein the tail element comprises one or more of: a length of the second section, a length of the first section, and/or a length of the digital media file.

8. The method according to claim 1, wherein the media file further comprising a header element arranged to form a starting portion of the digital media file, the header element being configured to allow a digital media reader to read the compiled reproducible media content of the first section.

9. The method according to claim 1, wherein the second section further comprises an identifier element to allow a digital media editor to identify that the digital media file is of said digital media format and to allow the digital media editor to read the first and second sections.

10. The method according to claim 9, wherein the identifier is further included in the file name.

11. The method according to claim 9, wherein the second section further comprises an identifier position element, which indicates the position of the identifier element.

12. The method according to claim 1, wherein the second section further comprises a cache element for caching compiled reproducible media content, different from the compiled reproducible media content of the first section.

13. The method according to claim 1, wherein the second section further comprises a project element for use in compilation of a digital media file from the one or more media elements.

14. The method according to claim 13, wherein the project element indicates a relative temporal position of the one or more media elements of the second section when compiling a digital media file.

15. The method according to claim 1, wherein the second section further comprises a table of contents indicating the position, name and length of the one or more media elements.

16. The method according to claim 1, wherein the second section further comprises a data element, the data element indicating a plurality of predetermined digital media file variants, compilable from the one or more media elements of the second section.

* * * * *